July 25, 1967  D. C. FISHER ET AL  3,333,045
BODY IMPLANTABLE ELECTRICAL CONDUCTOR
Filed July 20, 1965

INVENTOR.
DAVID C. FISHER
HUGH M. FORMAN
BY
Ralph G. Hohenfeldt
ATTORNEY

United States Patent Office 3,333,045
Patented July 25, 1967

3,333,045
BODY IMPLANTABLE ELECTRICAL
CONDUCTOR
David C. Fisher and Hugh MacDonald Forman, Brookfield, Wis., assignors to General Electric Company, a corporation of New York
Filed July 20, 1965, Ser. No. 473,403
8 Claims. (Cl. 174—20)

ABSTRACT OF THE DISCLOSURE

A helical cable of fine silver coated stainless steel wires, loosely fits into a silicone rubber tube which is filled with silicone fluid and sealed. Straight ends of the cable pass out through the seals. One end is sealed in an attachment plug which connects with a body implanted power supply and the other end has a severable surgical needle for engaging the cable with the tissue of an organ that is to be electrically stimulated. A silicone rubber sleeve with sealed ends surrounds a pair of such tubes to make a two-conductor assembly.

---

This invention relates to a conductive lead assembly for connecting an electric power supply to an organ in a living subject. An important, but not exclusive use of the new lead assembly is to connect a body implanted electronic pacemaker to the heart for stimulating it to beat at a desired rate and thereby sustaining the life and activity capability of the subject.

The human body imposes stringent requirements on electrical conductors that are implanted in it. The purport of this statement may be appreciated by observing that in the region near the heart attachment, the leads may be subjected to flexure with every heart beat which total approximately 100,000 per day or over 30 million a year. Parts of the leads which are remote from the heart, are often embedded in muscle that places stresses of various kinds on the conductors and their insulation during every movement of the body. A living body also constitutes a site that is chemically and biologically hostile to anything that invades it. Therefore, it is not surprising that with prior art leads, the conductors and insulation deteriorated in a period that was shorter than desired for a device that requires major surgery to correct.

Objects of the present invention are to provide an implantable lead assembly that is compatible with the body, that has long conductor and insulation life, that has low electrical resistance, that is not infiltrated by body fluids, that is unusually flexible, small, relatively inexpensive, has self-lubricating and damping properties and, that is easy to use. How these and other specific objects are achieved will be observed throughout the ensuing specification.

The new lead assembly is generally characterized by flexible insulating tubes surrounding helically formed multi-strand cables. The tubes are filled with a lubricating and movement damping substance and sealed at both ends from which straight portions of the conductive cable emerge. One end of the cables may be attached to a connector for joining it with an implanted power source and the other end may be provided with surgical needles for attachment to an organ such as the heart. The tubes are ordinarily paired and enclosed in a re-enforcing tubular sheath which is sealed at its ends and provides mechanical strength and protection.

A detailed description of a preferred embodiment of the invention will now be set forth in reference to the drawing in which.

Figure 1:
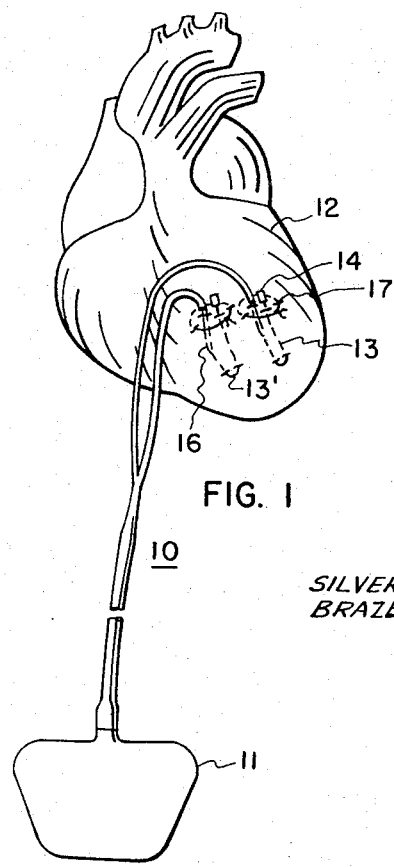
FIGURE 1 shows an outline of a human heart to which an implantable electronic cardiac pacemaker is connected by means of the new lead assembly.
Figure 3:
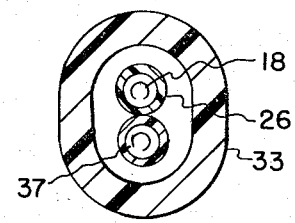
FIGURE 3 is a cross-section of the lead assembly taken on the line 3—3 in FIGURE 2.

FIGURE 1 shows how the new lead assembly 10 may be used to connect an implanted cardiac pacemaker 11 to the subject's heart 12. Electric pulses from the pacemaker are delivered to the heart from the bare cable ends 13 which terminate in ferrules 14 that may be squeezed on the conductor ends after the latter is drawn through the myocardium. Until the bare cable ends 13 are installed in the myocardium, they are equipped with surgical needles 15 which may be cut off after ferrules 14 are in place. It may be seen that one pass of the cable is made into the myocardial tissue from which it emerges to form a loop 13' after which another pass is made into the tissue and is terminated in ferrule 14. An insulated portion 16 also lies under the surface of the myocardium. A suture loop 17 may be tied around the end of cable 13 on the proper side of the ferrule and around an insulated portion of the leads as shown to assure against withdrawal from the heart.

Figure 4:
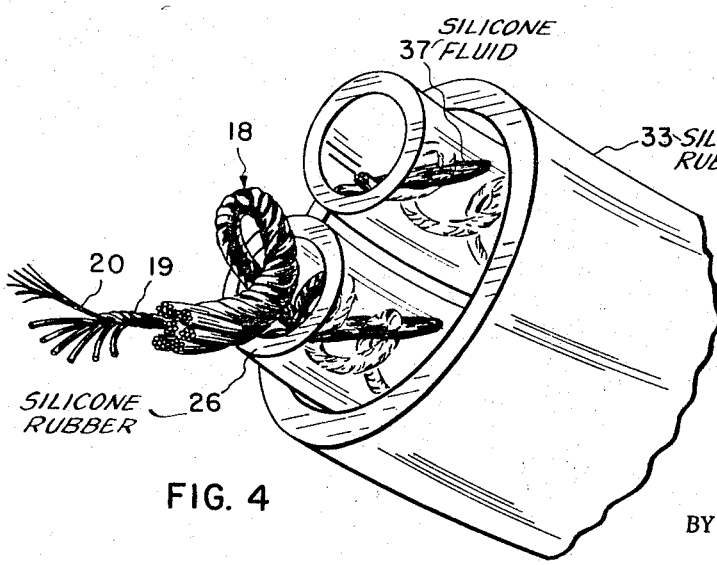
FIGURE 4 is a perspective view of a segment of the lead assembly which may be considered as having been removed approximately from the region 3—3 in FIGURE 2; and, FIGURE 5 is a cross-section of one of the wires for the conductive cable in the lead assembly.

The manner in which the electrical conductors in the new lead assembly are made for unusual flexibility, conductivity, and life will now be described primarily in connection with FIGURES 4 and 5. It will be seen in FIGURE 4 that each conductor is a helically wound cable 18 which, in this case, is made up of seven strands 19 which are comprised of seven small diameter wires 20. Each wire is also made up of a total of seven filaments, see FIGURE 5, which are brazed together. Thus, each helical cable 18 is composed of a total of 343 individual conductive filaments in this example, although those versed in the art will readily appreciate the other numbers of filaments, wires, and strands would be permissible. In FIGURE 4, the one wire that has the reference numeral 20 applied, is spread out at its end to demonstrate that it is made up of filaments but these are ordinarily brazed together as will be described later.

Figure 5:
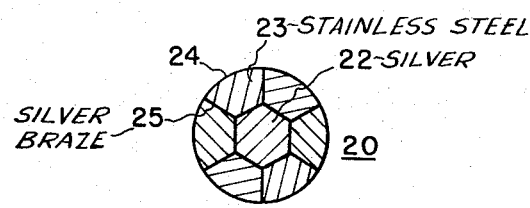

A cross-section of a wire 20 is shown enlarged in FIGURE 5. This round wire has a diameter of 0.0018 inch in one embodiment. It will be seen that each wire 20 comprises a hexagonal core 22 surrounded and enclosed by wedge-shaped filaments 23. Core 22 is preferably silver. The six wedge-shaped filaments 23 are preferably 316 ELC stainless steel coated with silver so that the outside surface 24 of the wire and the abutting interfaces or joints 25 have silver on them.

The wires 20 are made substantially in accordance with the method described in U.S. Patent 3,006,384 and are available from the assignee of that patent. This wire is popularly called drawn, brazed, stranded wire. Briefly, the method involves taking six silver-plated stainless steel filaments 23 and a silver filament 22 and drawing them simultaneously through a forming die while subjecting them to annealing heat until near the last stages of drawing. The annealing temperatures are sufficient to cause the silver coating to flow and braze the stainless steel filaments 23 and silver core 22 together as shown in FIGURE 5.

In FIGURE 4, it may be seen that each helically wound cable 18 comprises seven wires 20 which are twisted together in a slowly advancing spiral to form a strand 19. Seven strands 19 are then twisted together preferably in a reverse spiral to form the cable 18. The cable is then wound into a helix. Summarily, it may be said that the cable itself is made in the conventional manner of making cables except for the helix.

Most of the strength in cable 18 results from the fact that individual wires 20 are primarily of stainless steel which is work-hardened in the last stages of drawing. Part of the resistance to damage by bending which cable 18 exhibits is due to the self-lubricating properties of the silver with which the individual wires 20 are coated. It should also be noted that the cable 18 has a high degree of redundancy in the 343 parallel conductive elements so that if breaks develop in several of the individual wires 20, impedance of the cable would not be affected significantly. Life tests have shown that this manner of making the cable extends the number of flexures that it will withstand as compared with the solid wire coiled conductors that have been used heretofore.

For reasons which need not be elucidated, it may be desirable in some instances to implant in organs conductors that are made or coated with a metal other than silver. In such cases, the wire 20 may be made substantially as described in connection with FIGURE 5 except that the wire may be plated all around on the outer surfaces 24 with another metal such as platinum on silver.

Cable 18 is wound into a helix on a small mandrel, not shown, while it is simultaneously admitted into a coaxial tube 26, that is seen best in FIGURE 4. The machine for winding the helical cable 18 into a helix is not shown since it is outside the realm of this invention, nor will it be described except to say that the mandrel is at least as long as the helix and has a diameter of 0.025 inch in one instance. When the helix leaves the mandrel and enters the flexible tube 26, it opens up to an inside diameter of 0.046 inch and an outside diameter of approximately 0.078 inch. The inside diameter of tube 26 to which the helical cable 18 is admitted is slightly larger than the outside diameter of the cable. This gives the cable 18 some freedom within tube 26 and eliminates some of the radial stresses which might be imparted to it by muscular movements of a subject in which it is implanted.

Tube 26 is preferably a material that is insulating, flexible, and body compatible. Medical grade silicone rubber-tubing has been found satisfactory.

When winding of cable 18 into a helix is initiated, its leading end is maintained in a straight condition and tinned to prevent fraying.

Figure 2:
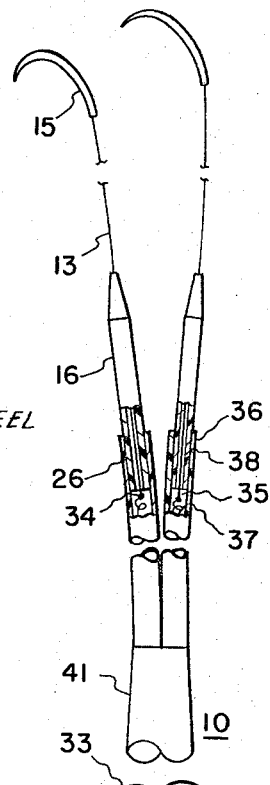
FIGURE 2 is a front view of the new lead assembly.

In FIGURE 2 it will be seen that the straightened, tinned end 27 of the cable emerges through a silicone rubber plug 28 and runs into a prong 29 of a plug assembly that is in a gold-plated metal shell 30. The shell has a pair of diametrically opposed side openings 31 that allow entry of a staking tool, not shown. The staking tool, of course, performs the usual function of crimping prong 29 so as to secure wire end 27.

In a practical case, two helical cables 18 are wound and admitted in a pair of tubes 26 simultaneously. During this step, a length of oval-shaped sheathing tube 33 loosely surrounds the pair of round tubes 26. The straight ends 27 of the cable 18 are then cut to length and are allowed to extend out of tubes 26 as described earlier. The opposite ends of the cables are also straightened in a region designated by reference numeral 13 in FIGURE 2. Within tubes 26 at the end just referred to, it will be seen that cable 18 is provided with a knot 34 which accepts the stress if tension is exerted on end 13 of the cable.

When the helical cables 18 are wound and have their opposite straight ends 27 and 13 extending from their surrounding tubes 26 and further surrounded by outer sheath 33, the tubes 26 are ready for being filled with a fluid substance 37, see FIGURE 4, that damps movement of the helix and lubricates it with respect to the interior surfaces of tubes 26 when subjected to flexure. A desirable substance for this purpose has been found to be No. 360 medical grade silicone fluid which remains in a fluid state over the life of the leads. Besides being stable and a good lubricant, the silicone fluid is absorbed superficially by the internal surface of silicone rubber tubes 26 to thereby reduce the durometer of the tubing and enhance its flexibility without adverse effects.

The silicone fluid 37 may be admitted to the open ended tubes 26, when they are in a vertical position, by means of an instrument with a small nozzle such as a hypodermic needle from which fluid may be expressed. The viscosity of the fluid is such as to allow it to fill the space around the helix without running out of the open lower end. In other words, the fluid flows toward the opposite end of the tube only as fluid is admitted to its upper end. This means that it is easy to allow a free space to occur within the end of tube 26 in the vicinity of knot 34 in the cable. This free space is then filled with room temperature vulcanizing, single component medical grade silicone rubber in the region marked 35 until it flows out of the end 36 of tubes 26. In FIGURE 2, the approximate uppermost level of the silicone fluid is designated by the irregular break line having reference numeral 37. When the end of tube 26 is filled with self-curing adhesive as described, the insulation extensions 16, which may also be silicone rubber, are slipped over cable ends 13 and forced into the upper ends of silicone rubber tubes 26, as shown in FIGURE 2. Some of the adhesive 35 is thereby forced through the hole 38 within insulating extension 16 to thereby bond it and the straight portion 13 of helical cable 18 intimately together. This effects a seal when cured which prohibits body fluids from entering the lead assembly. At any convenient time thereafter, the suture needles 15 may be swaged onto the straight lead ends 13.

With one end of the cable assembly sealed off as described above, it may be inverted for the purpose of admitting room temperature vulcanizing adhesive 39 into what was formerly the lower end of the assembly and the tubes 26. The adhesive surrounds the extending straight portions 27 of the cable. Silicone rubber plugs 28 are then forced into the ends of the respective tubes 26 to thereby cause the adhesive to flow along straight wire 27 and seal it in when cured. The straight wire ends 27 may then be staked in the connector prongs 29 as described earlier.

It should be observed that the ends of tubes 26 extend into metal connector shell 30 until they stop against an insulator 40. The individual tubes 26 have some clearance around them where they enter the top of metal connector shell 30 and this space is also filled with silicone rubber adhesive which cures by itself in a short time. Thus, it may be seen that the lead assembly is essentially a solid mass that can only be bent at a point above the top edge of the metal connector shell 30 in the zone where the cable 18 is helically formed and surrounded by fluid. This construction removes bending stresses from the straight wire ends 27 and thereby greatly reduces the likelihood of breakage.

When the assembly described above is substantially complete, the outer silicone rubber sheath 33 may be slid along the outside of the pair of tubes 26 to the position in which it is shown in FIGURE 2. Prior to doing this, silicone rubber sealant is deposited on connector shell 30 for allowing sheathing tube 30 to adhere to it, thus prohibiting body fluids from entering the lead assembly from that end.

Following the steps described above, the other end of outer sheath 33 may be sealed with respect to the exterior of the pair of tubes 26. This is done by molding a transition cone 41 out of room temperature vulcanizing silicone rubber. A mold, not shown, having the same internal configuration as the external shape of transition cone 41 and open at both ends, is slipped over tubes 26 until it abuts the end of outside sheath 33. The space within the mold is filled with self-curing silicone adhesive which bonds to the exterior of tubes 26 and joins with the outer sheath 33 to effect an endwise and radial seal.

A construction for making a leak-proof connection between lead assembly 10 and an implated device such as a pacemaker power supply 11 is described in the copending application of the instant inventors which was filed on the same date as this application and has Ser. No. 473,451.

The preferred embodiment of the invention described above has tubes 26 filled with silicone fluid that surrounds the cable 18. It should be understood, however, that filling with other fluent substances also improves lead life as compared with leads that have been used heretofore. For instance, filling with finely powdered Teflon has yielded fair flexibility and lubricating qualities. Other viscous substances may be used if they approximate the lubricating properties of silicone fluid and are compatible with the adhesives that are used.

One of the major advantages to the lead assembly described above is that the silicone fluid 37 surrounding the helical cable maintains a lubricating film between the cable and interior of tubes 26. This may prolong the life of the tubing more than it does the life of the cable; however, the presence of the fluid prevents the cable from lashing freely within the tube, or in other words, it has a movement damping effect on the cable which protects against internal wear incidental to bending. In addition, the presence of the fluid makes the lead assembly more resistant to deformation from radial forces which X-ray pictures of implanted leads show to impose severe transverse stresses on the conductors. Another advantage from use of the fluid is that if there are any punctures in the tubes surrounding the helical cable the fluid will leak out and cause glossiness on the exterior of the tubes in which case the lead assembly may be rejected by simple inspection.

In summary, a body implantable electrical lead assembly has been described which features good insulating properties, conductivity, flexibility, the absence of stress points, corrosion resistance, lightness of weight, elasticity, resistance to tensile force, body compatibility and long life. These features are obtained in some degree by the general manner of construction and further from the use of a helical cable conductor with an insulating and lubricating fluid surrounding it.

Although a preferred embodiment of the invention has been described in sufficient detail to enable those skilled in the art to reproduce it, it should be understood that such description is illustrative rather than limiting, for the invention may be variously embodied and is to be considered limited only by interpretation of the claims which follow.

It is claimed:

1. A body implantable electrical conductor assembly comprising:
    (a) a flexible insulating tube that is sealed near each of its ends,
    (b) a helically formed conductive cable that fits loosely inside the tube and is substantially coaxial with the tube and that has opposite straight end portions extending sealingly from the tube, and
    (c) a fluent insulating substance inside the tube and immersing said helical cable.
2. The invention set forth in claim 1 wherein:
    (a) said fluent insulating substance is a silicone fluid.
3. The invention set forth in claim 1 wherein said cable comprises:
    (a) a plurality of fine wires twisted in the same direction with each other to form a strand, and
    (b) a plurality of strands twisted with each other to form the cable,
    (c) the fine wires comprising:
    (d) a central metal filament,
    (e) a plurality of other metal filaments surrounding said central filament,
    (f) said plurality of filaments each being coated with a metal that constitutes a brazing metal that joins all of said filaments as a unitary wire.
4. The invention set forth in claim 3 wherein:
    (a) said central filament is substantially pure silver,
    (b) said plurality of surrounding filaments are stainless steel, and
    (c) said brazing metal is silver and coats the entire surface of said filaments.
5. A body implantable conductor assembly as in claim 1 wherein:
    (a) the said tube is a silicone rubber insulating tube loosely surrounding the helical cable substantially coextensive and substantially coaxially therewith,
    (b) the said fluent substance is a viscous silicone compatible fluid in said tube immersing said cable, and
    (c) an adhesive sealant closing each end of said tube,
    (d) said cable having essentially straight end portions extending through said sealant whereby to connect said cable in an electric circuit.
6. The invention set forth in claim 5 including:
    (a) an insulating extension admitted to at least one end of said tube and having a central hole for passing one of said straight end portions of the cable therethrough,
    (b) said sealant continuing along the inside of the hole to prevent body fluids from following along the cable.
7. A body implantable conductor assembly having controlled flexing stress characteristics comprising:
    (a) a pair of flexible insulating tubes that are each sealed at the opposed ends,
    (b) a helically formed cable in each tube and terminating in straight portions that extend through the seals,
    (c) a viscous fluid in each tube, which fluid is retained by the seals,
    (d) an insulating extension sealingly surrounding a straight portion of cable at corresponding ends of each tube and extending into each tube,
    (e) a flexible sheath encompassing said tubes along at least a part of their lengths,
    (f) a molded stress transition cone joining said sheath and said tubes to thereby allow gradually increasing flexibility in a direction toward the above mentioned ends of the tubes.
8. The invention set forth in claim 7 wherein:
    (a) said fluid is a silicone lubricant,
    (b) said tubes and sheath are of silicone rubber, and
    (d) said transition cone is moldable silicone rubber.

References Cited

UNITED STATES PATENTS

| | | |
|---|---|---|
| 839,260 | 12/1906 | Benson. |
| 2,396,268 | 3/1946 | Jones _____ 174—101.5 |
| 2,428,480 | 10/1947 | Tunstall _____ 174—24 X |
| 2,764,625 | 9/1956 | Ingmanson _____ 174—69 |
| 3,006,384 | 10/1961 | Brown et al. _____ 57—146 |

FOREIGN PATENTS

| | | |
|---|---|---|
| 1,235,002 | 5/1960 | France. |

LEWIS H. MYERS, *Primary Examiner.*

H. HUBERFELD, *Assistant Examiner.*